A. L. GENTER.
FILTERING PROCESS.
APPLICATION FILED JAN. 4, 1915.

1,218,544.

Patented Mar. 6, 1917.

Witnesses
Philip E. Barnes
G. Manning

Inventor
Albert L. Genter,
By T. Walter Fowler,
Attorney

UNITED STATES PATENT OFFICE.

ALBERT LEGRAND GENTER, OF SALT LAKE CITY, UTAH.

FILTERING PROCESS.

1,218,544.  Specification of Letters Patent.  Patented Mar. 6, 1917.

Application filed January 4, 1915. Serial No. 519.

*To all whom it may concern:*

Be it known that I, ALBERT L. GENTER, a citizen of the United States, residing at Salt Lake City, in the county of Salt Lake and State of Utah, have invented certain new and useful Improvements in Filtering Processes, of which the following is a specification.

My invention relates to a process of automatically indicating, compressing, and drying cakes in filter presses, and the invention consists of the steps and the order and succession of steps constituting the process substantially as hereinafter described and claimed.

In the accompanying drawings I disclose several types of apparatus suitable for carrying out my process and wherein;

Fig. 5 illustrates in section a fragment of a filter press having a porous or foraminous compression plate, hereinafter described.

While I have shown for illustrative purposes several forms of apparatus suitable for carrying out my process, I wish it understood that the process is not limited to the same, or in fact to any particular apparatus.

It is well known in practice with filter presses and filtering devices of all kinds, that cakes result at times that must be obtained as dry as possible. Heretofore these cakes have been pressed into a very compact form either mechanically or hydraulically by pressing a solid surface against them after filtration and washing or, as is also usual in the plate-and-frame presses, by admitting a gaseous pressure means such as steam or compressed air to the backs of the filter cloths, thus squeezing the filtering surfaces, with intermediate cakes, together. This steam or air pressure is also used in bag or leaf filters by application directly upon the free cake surface. This means works to the extent where the cakes contract through loss of moisture and crack. As the steam or air then flows through these cracks instead of the more resisting cake, it will be seen that a further removal of the moisture is impossible. The hydraulic piston or mechanical means is also impractical because it necessitates extra mechanical pressure mechanism.

The following description covers a principle discovered by myself, and is automatic, as well as thoroughly efficient in effect. It can be used for automatically and hydraulically expressing undesired liquid matter from cakes already formed, especially where the cake material as well as filtrate, or only the cake material, is valuable and must be obtained in the filter press with as little liquid contents as possible. For instance, in the chemical industry, the filtration of oils from paraffin; in the sugar industry where solid cakes are used for fertilization purposes; and in metallurgical industries, etc.

Figure 1:
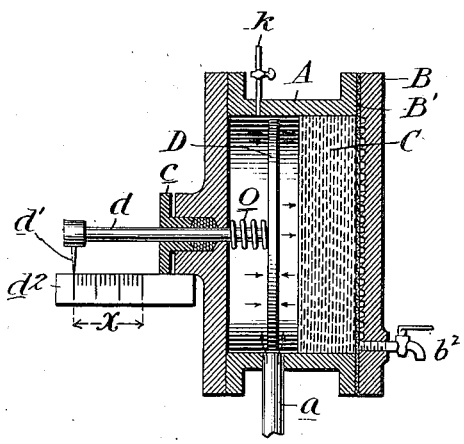
Figures 1 and 2 are similar sectional views of a filter press chamber and cake thickness indicating means.
Figure 2:
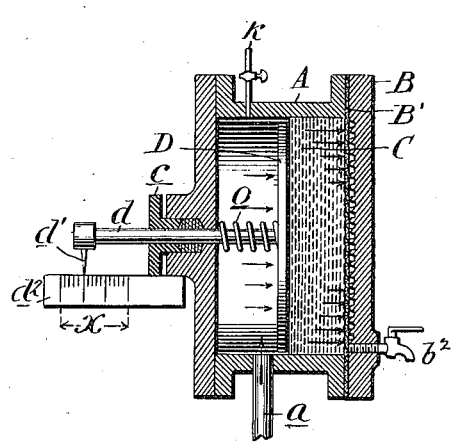

Referring to Figs. 1 and 2, A is a closed vessel, similar to the corresponding part of any well known filter press.

B is a corrugated filter-plate or frame covered with filter cloth, B', said plate or frame having means, $b^2$, for carrying off the filtrate.

D is a disk, plate or follower of any material solid or foraminous attached to a stem, $d$, which is slidably mounted, in a stuffing box, $c$, in this instance, and having a pointer, $d'$, operable over a graduated plate, $d^2$, or the like for visibly indicating the automatic action before referred to.

In operation, the chamber A is filled with the material to be separated by filtration through an inlet, $a$, and the air escapes, as is usual with all filter presses, through a proper outlet, $k$.

The cake, C, forms on the cloth, B', of the filter plate, B, through separation of solids and liquids as is usual in all filters. During this procedure the hydraulic pressure on the interior of the entire chamber within the closed vessel, A, is that of the actuating supply pump or pressure head. For example, let the pressure in this case assume a maximum of 3 atm. (45 lbs.). Having reference now to the filter plate or frame, D, it will be seen that this has equal hydraulic pressure on both sides, as indicated by the arrows in Fig. 1. The pressure that would here act on the plate, D, and tend to push the stem $d$ thereof out through the stuffing box, $c$, is equalized by the spring, $o$, on said stem between the follower and the inner wall of the vessel, A. The cake also has this hydraulic pressure over its entire surface. If the cake grows to the extent that it touches the disk, plate or follower, D, the hydraulic equilibrium on the latter is disturbed so that the cake only has direct filtration pressure around its periphery, the disk or plate fitting the chamber of the vessel loosely, which pressure decreases near the center of the cake, as shown by the arrows in Fig. 2, because its direct access to that part is obstructed by the disk or plate, and the hydraulic pressure on the right side of the disk or plate is consequently lessened, so that the 3 atm. pressure on the left side being greater, according to the area, the disk or plate suddenly or gradually moves toward the filter plate, B, meeting nothing but the mushy resistance of the cake, the particles of which are automatically crowded closer together (see Fig. 2), squeezing the moisture of the previously porous cake through the filter cloth, B', and out through the pipe, $b^2$.

The amount of moisture squeezed out depends on the hydraulic pressure in the vessel, A, and the nature of the solids in the cake.

The point at which the compression shall automatically take place can be determined in this case on the outside of the press. The distance indicated by the line —x— on the scale $d^2$, of Figs. 1 and 2, equals the distance the disk or plate, D, is placed from the filtering surface before beginning filtration; i. e. equal to the desired porous cake thickness. This can be measured accurately by the pointer $d'$, on the stem of the plate.

If it is necessary to remove values left in the compressed cake, the disk, D, can be made of a porous or foraminous material as in Fig. 5. After automatic compression, the excess unfiltered material in the vessel, A, can be drawn off and wash water pumped in. This penetrates the foraminous disk, D, and the compact cake, which has already been partially rendered free of moisture by compression, so that little wash water will be needed to remove the balance of the values. The pressure of the wash water can be the same as filtration pressure or higher. After washing, high-pressure steam or air can be admitted to the back of the disk, D, for further cake drying, if such is necessary.

In a press where a series of cakes and compression surfaces, D, would be necessary, one alone could be made to show visible indicating action outside of the filter press. This is necessary for one important reason. In cases where the cakes are given a subsequent wash through the foraminous compression surfaces, filtration must be, in most instances, stopped immediately upon the point of the compression surfaces moving inward toward the filter cloth, otherwise filtration would continue through the foraminous compression surface thus giving a second cake. Consequently, if this second cake is not desired, as it will not be in most instances, one disk can be connected as indicator to exterior registering board, thus indicating electrically or otherwise when filtration should be stopped, or so connected that it will through its positive action actuate any practical mechanism that will automatically shut off filtration.

This may or may not be necessary in filtration of substances giving cakes that do not need washing.

Again, this principle may be changed to where neighboring filter plates are slidably mounted and when two cakes meet or a cake and the rear of the following plate, the plates themselves are automatically pressed together by the filtration pressure itself.

Figure 3:
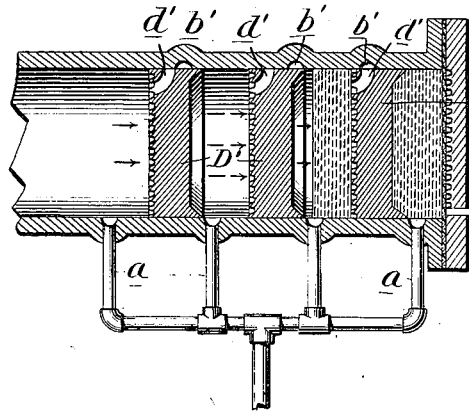
Fig. 3 is a sectional view of another embodiment of filter press suitable for the carrying out of my process.

Or each compression plate may be so arranged that it forms a new filtering surface for a second cake, and so on (Fig. 3) in series, thus giving a continuous action based on this principle. Here each compression plate is also a filtering agent. In Fig. 3, the sliding action of the plates, D', D', could automatically open new filtrate outlets if said plates were constructed as slide valves whose filtrate outlets, $d'$, connect above with the suitable outlet ports, $b'$, which remain closed until the disks or plates are automatically actuated to move and the said outlets and ports are brought into register.

In presses of the so-called leaf-type, the compression surfaces can be suspended between the frames and one surface made the indicating surface where such is desired. Or a small auxiliary filter plate can be constructed with individual indicating compression surface.

Figure 4:
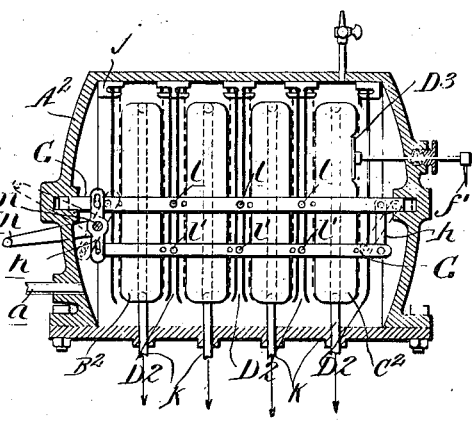
Fig. 4 is a sectional view of a further modified form of filter press.

If one desires to use impervious compression plates instead of foraminous plates and still wash the cakes before compressing with the wash-liquid pressure or with compressed air, steam or other gaseous liquid pressure means, the auxiliary arrangement shown in Fig. 4, may be used. In this case, there is suspended between the filtering elements and cakes the movable compression plates, $D^2$, arranged at distances greater than the desired cake thickness. A small indicating disk, $D^3$ and pointer, $f'$ are placed at a distance equal to the thickness desired from one of the filtering elements—or one of the compression plates can be used as an indicator and thus placed at the desired cake-thickness distance from one element. In Fig. 4, along one inside wall of the filtering chamber two rods, G, G, can be slidably mounted in proper bearings, being connected at a suitable place by the link, $h$, and furnished with pins, $l$, that fit in the spaces between the compression plates $D^2$, $D^2$.

The link, $h$, can be shifted by placing it on a revoluble shaft, $m$, passing through a stuffing box to a crank, $n$, outside.

In the construction shown in Fig. 4, the impervious compression plates are suspended between the filter frames, $B^2$, in slotted supports, $j$. The idea here is to wash the cakes previous to compression, thus doing away with the foraminous compression plates previously described. The impervious compression plates are suspended between the filter elements or frames, $B^2$, at a greater distance than the desired cake thickness which latter may be indicated by the small compression or indicating disk, $D^3$, and the pointer, $f'$, which operate substantially in the manner before described. As soon as the small indicating disk, $D^3$, causes the pointer to indicate the desired cake thickness, filtration is stopped and wash water is introduced after withdrawing the excess unfiltered material from between the cakes or by direct introduction of wash water, which may be effected in any manner well known in this art.

As the cakes are not built out to the main compression plates, $D^2$, they can be washed directly through their free surfaces. After completing the wash, the cakes are compressed and dried by first moving the compression plates over against the cake surfaces, as previously described and during the sliding of the compression plates against the cake, the washing or other pressure is maintained within the casing or chamber, $A^2$.

The mechanism for moving or changing the position of the compression plates, $D^2$, after washing and previous to compression and drying, comprises the two rods, $G, G$, which are movably or slidably mounted in proper bearings shown at each end of the casing or compression chamber, these rods being connected at a suitable place by the links, $h, h$, provided with pins $l, l$, that fit in the spaces between the compression plates. The left-hand link, $h$, shown in the drawing, can be shifted or turned by placing it on a revoluble shaft, $m$, passing through a stuffing box to the crank, $n$, outside of the filter chamber, $A^2$.

Upon the completion of the washing operation, the crank $n$, may be readily turned to shift the rods, $G, G$, and the links, $h, h$, and thus push the suspended movable compression plates, $D^2$, apart so that they come in touch with the cakes by sliding in the supports, $j$. During this procedure, the washing or other pressure is maintained within the filter chamber as before described. It is obvious that the plates, $D^2$, will be forcibly and automatically pushed farther into the cake mass or to be more exact will squeeze or compress the cake mass the instant the compression plates touch the cake surfaces, and compression may be increased and the cakes compactly compressed by the hydraulic or other pressure employed in the compression chamber, the liquid filtrate being forced to the interior of the filter frames and being delivered through appropriate outlets, $K$.

During filtration the small disk or indicating plate, $D^3$, Fig. 4, will show when filtration should be stopped, then the washing liquid can be introduced and the cakes washed through their exposed surfaces. Upon completion of the washing, the crank, $n$, of the shaft, $m$, can be easily turned so that the pins, $l$, on the rods, $G, G$, touch the compression plates, $D^2$ and force them apart, by virtue of the link-motion conveyed to the rods, $G$. During this procedure, the washing, or other pressure can be maintained within the filtering chamber. It is clear that the plates, $D^2$, will be forcibly and automatically pushed into the cakes by virtue of the hydraulic principles herein set forth, as soon as the link-motion brings them in contact with the cakes. Then the hydraulic or gaseous pressure can be increased and the cakes compactly compressed.

In any such a compression arrangement, the compression surfaces can, like in the continuous arrangement, move with the cakes, or the compression surfaces can be mounted rigidly and the elements with the cakes made movable, or where it is thought advisable, the compression plates can be entirely omitted and the elements with their cakes made movable, whereby the elements with their cakes become compression platefiltering agencies. Through this arrangement neighboring cakes may be built up until their surfaces touch. At this point either two or a large series of neighboring elements with their cakes on both sides are automatically pressed together by virtue of the filtration and hydraulic principles herein described.

Although I have shown certain general specific elements for carrying out the present process, yet it must be understood that I do not limit myself to these elements, as my process will enable me to employ any mechanical arrangements of the filter elements or compression plates to either compress all the filter cakes and to indicate the cake thickness, or to indicate the thickness alone.

Having thus described my invention, what I claim as new and desire to secure by Letters Patent is:—

1. The process herein described of automatically compressing filter cakes and indicating the thickness thereof, said process consisting, essentially, in arranging a compression plate in a closed pressure chamber and at a desired distance from a filter surface, then producing an equalized hydraulic pressure on both sides of the compression plate during filtering operation and automatically disturbing the pressure by reason of the cake mass coming in contact with the compression plate, whereby the filtration or hydraulic pressure on one side of the plate will be lessened through the cake mass taking its place, and the filtration or hydraulic pressure on the other or free side of the plate will automatically cause said plate to move inward toward the filtering surface and compactly compress the cake mass and indicate the cake thickness.

2. The process herein described of automatically compressing filter cakes and indicating their thickness, said process consisting, essentially, in arranging compression plates in a chamber at a desired distance from filter agencies, then producing an equalized hydraulic pressure on both sides of the compression plates during the filtering operation, and automatically disturbing the pressure by reason of the cake mass coming in contact with the compression plates, whereby the filtration or hydraulic pressure on one side of the plates will be lessened through the cake mass taking its place, and the filtration or hydraulic pressure on the other or free side of the plates will automatically cause said plates to move toward the opposed filtering agencies and compactly compress the cake mass and indicate the cake thickness.

3. The process herein described of compressing filter cakes and indicating their thickness, said process consisting, essentially, in movably arranging filtering agencies and compression plates in a pressure chamber at desired distances from each other; then producing a hydraulically equalized pressure on both sides of the filtering agencies and plates during filtration, and then automatically disturbing said pressure by reason of the cake mass building up and wholly or partly filling the space between the plates and filtering agencies, whereby the filtration or hydraulic pressure on one side of the plates or filtering agencies will be lessened, and the filtration or hydraulic pressure on the free side of a plate or cake opposing the plate, will cause the plates and opposed filtering agencies to approach each other and compress therebetween the cake mass and indicate the cake thickness.

4. The process herein described of automatically compressing filter cakes and indicating their thickness said process consisting, essentially, in arranging filter compression plates in a chamber at a desired distance from other compression plates also designed to act as filtering agencies, then producing a hydraulically equalized pressure on both sides of the plates during filtration, and then automatically disturbing said pressure by reason of the cake masses building up and wholly or partially filling the space between the plates whereby the filtration or hydraulic pressure on one side of the plate-filtering agencies will be lessened and the filtration or hydraulic pressure on the free side of said plates or cakes opposing the plates will cause the plates to approach each other and press therebetween the cake masses and indicate the cake thickness.

5. The process herein described of compressing filter cakes and indicating their thickness, said process consisting, essentially, in arranging a filter agent and an indicating compression plate in opposed relation in a pressure chamber together with further compression plates and filter agents; then producing a hydraulically equalized pressure on both sides of the plate during filtering operation; then disturbing the equalized pressure on one side of the indicating plate by causing a filter cake to wholly occupy the space between one side of said plate and the opposed side of the filter agent; and continuing the hydraulic pressure on the opposite side of said plate to cause the latter to move toward the former and compress the interposed filter cake and indicate the cake thickness.

6. The process herein described of compressing filter cakes and indicating their thickness, said process consisting, essentially, in arranging compression plates in a chamber at desired distances from filter agencies, one of the plates being an indicating compression plate and being placed nearer one filter agency than the balance of the compression plates are from the balance of the filter agencies; then producing a hydraulically equalized pressure on both sides of the plates during filtering operation; then disturbing equalized pressure on one side of the indicating compression plate by causing a filter cake to wholly occupy the narrower space between one side of the indicating compression plate and the opposed side of the filter agent before the wider space between the balance of the compression plates and filter agencies is wholly occupied by filter cakes; then displacing or withdrawing the excess unfiltered material from the space partially filled with filter cake between the balance of the compression plates and filter agencies by admitting to this space between cakes and compression plates a washing fluid under pressure, and forcing same through the cakes to remove therefrom retained values; then during the continuance of the wash or hydraulic pressure, mechanically moving the balance of the compression plates toward the cakes adhering to the balance of the filter agencies until the space between one side of the compression plates and the filter agencies is wholly occupied by filter cakes; then continuing the hydraulic washing pressure on the opposite side of said plates to cause the latter to move toward the filter agencies and compress the interposed filter cake to the desired thickness or compactness.

7. The process herein described of automatically compressing filter cakes and indicating their thickness, said process consisting, essentially, in arranging foraminous compression plates in a chamber at a desired distance from filter agencies, then producing an equalized hydraulic pressure on both sides of the foraminous compression plates during the filtering operation; and automatically disturbing the pressure by reason of the cake mass coming in contact with the foraminous compression plates, whereby the filtration or hydraulic pressure on one side of the foraminous plates will be lessened through the cake mass taking its place, and the filtration or hydraulic pressure on the other or free side of the plates will automatically cause said plates to move toward the opposed filtering agency and compactly compress the cake mass and indicate the cake thickness, then withdrawing or displacing the excess unfiltered material from the pressure chamber, by then admitting to the chamber a washing fluid under pressure and forcing the same through the foraminous compression plates and compressed cake to remove therefrom any retained values.

8. The process herein described of automatically compressing filter cakes and indicating their thickness, said process consisting, essentially, in arranging foraminous compression plates in a chamber at a desired distance from filter agencies, then producing an equalized hydraulic pressure on both sides of the foraminous compression plates during the filtering operation, and automatically disturbing the pressure by reason of the cake mass coming in contact with the foraminous compression plates, whereby the filtration or hydraulic pressure on one side of the foraminous plates will be lessened through the cake mass taking its place, and the filtration or hydraulic pressure on the other or free side of the plate will automatically cause said plates to move toward the opposed filtering agency and compactly compress the cake mass and indicate the cake thickness, then withdrawing or displacing the excess unfiltered material from the pressure chamber, by then admitting to the chamber a washing fluid under pressure and forcing the same through the foraminous compression plates and compressed cake to remove therefrom any retained values, and then drying the cake mass by admitting a gaseous drying agent into the pressure chamber.

In testimony whereof I affix my signature in presence of two witnesses.

ALBERT LEGRAND GENTER.

Witnesses:
 RAYMOND M. LOWE,
 JAMES B. WALKER, Jr.